April 20, 1965        M. A. MITTLER ET AL        3,179,913
RACK WITH MULTILAYER MATRIX BOARDS
Filed Jan. 25, 1962                                                        6 Sheets-Sheet 1

INVENTORS
MARTIN A. MITTLER
SEYMOUR OFFERMAN
ROBERT B. PITTMAN
BY RICHARD A. ROSENBERG

James and Franklin
ATTORNEYS

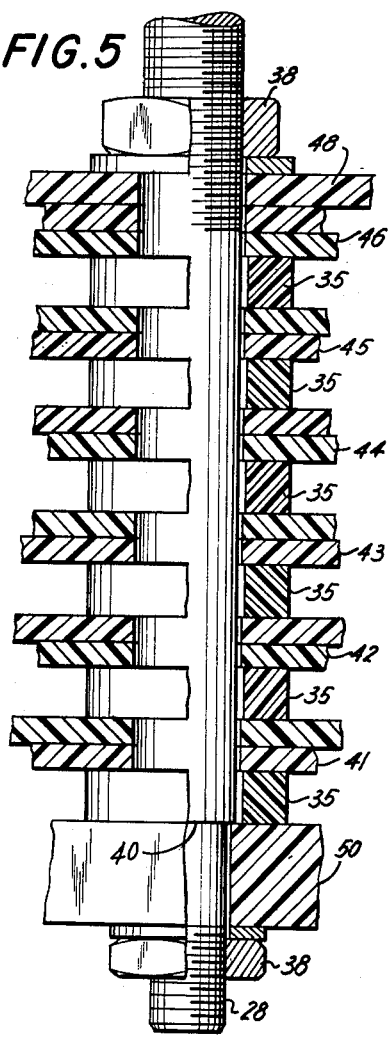
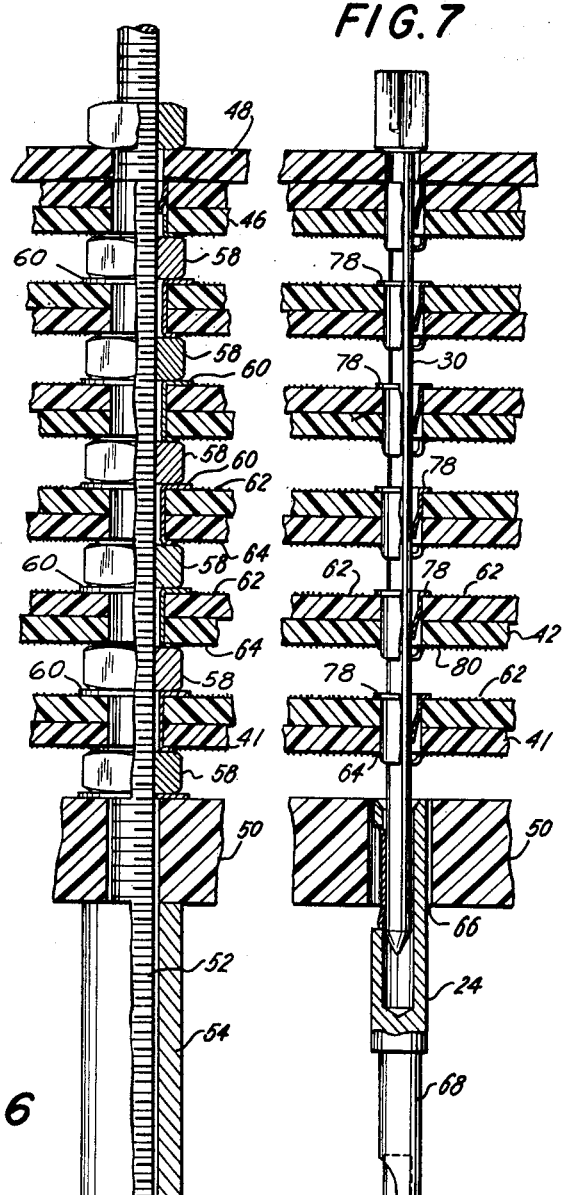
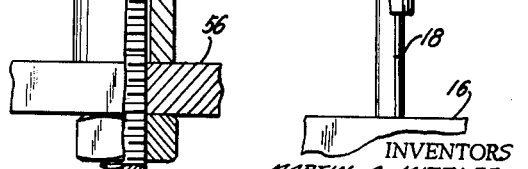

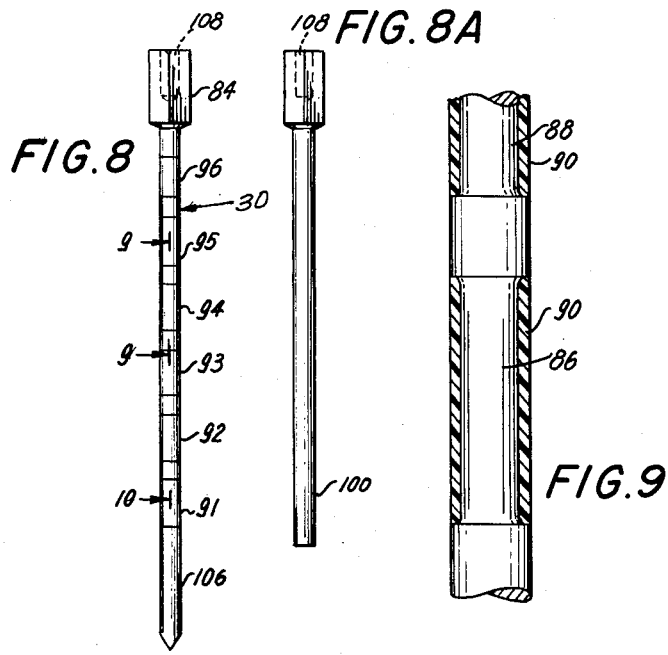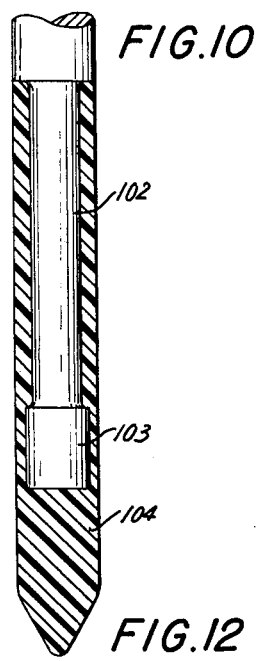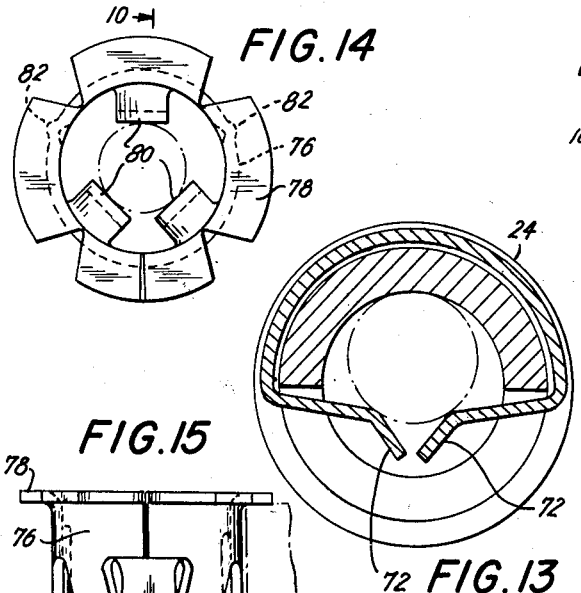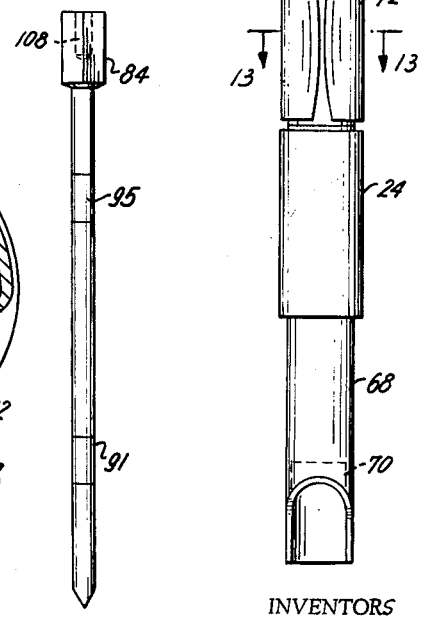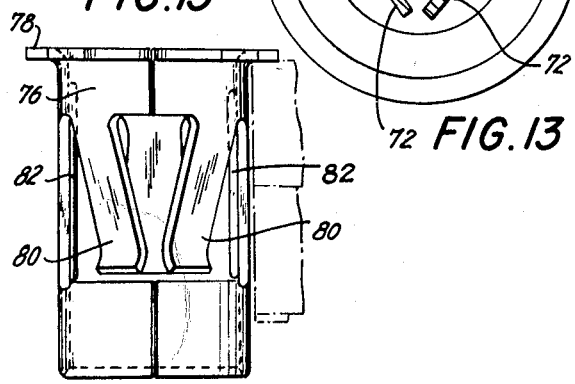

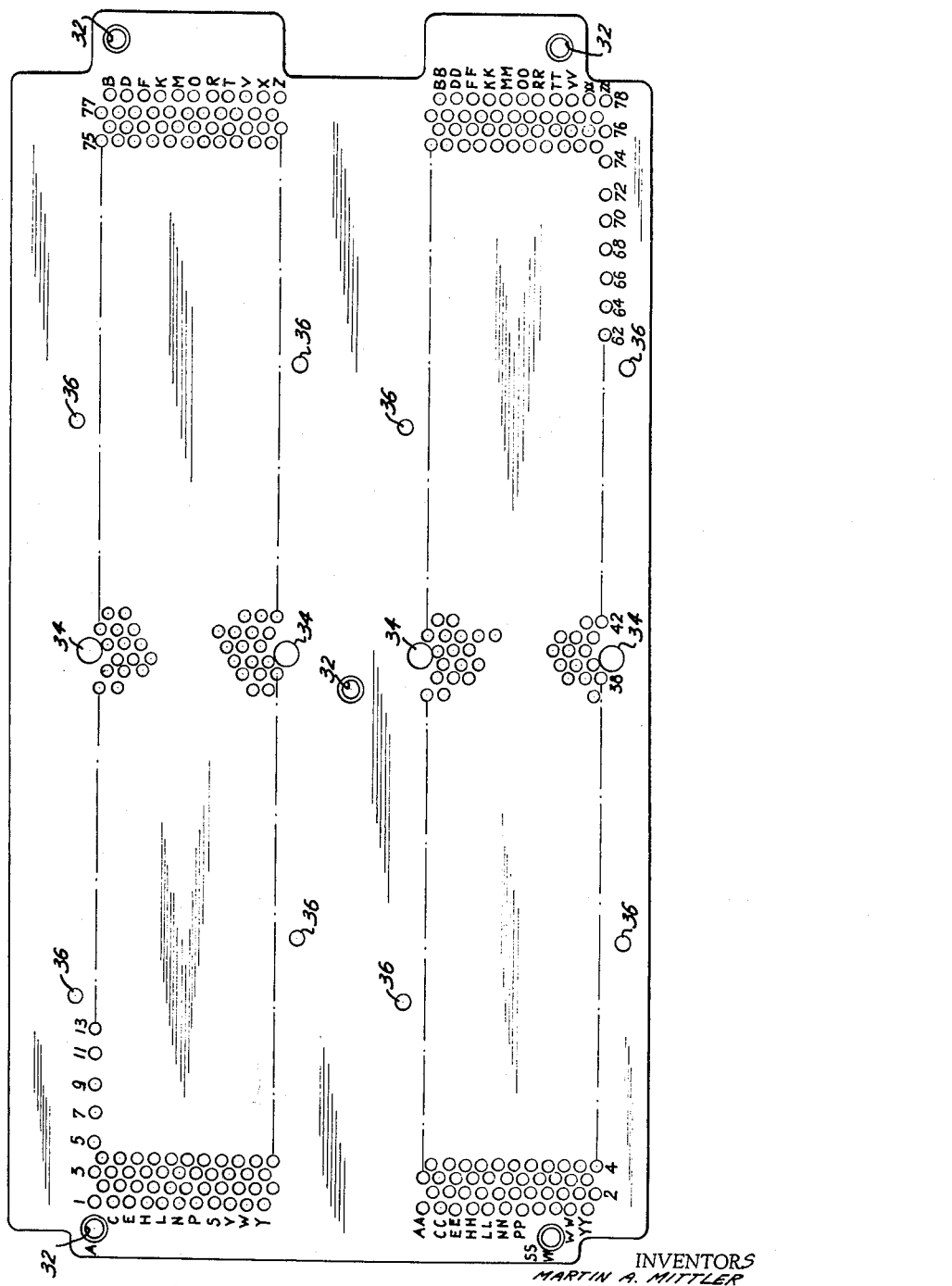

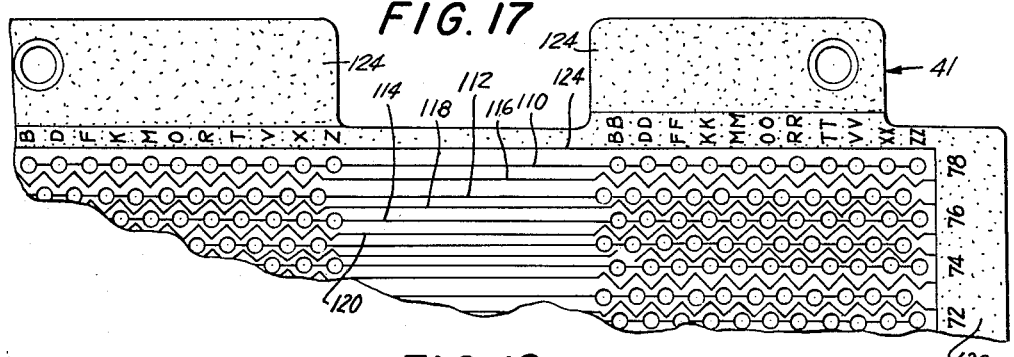
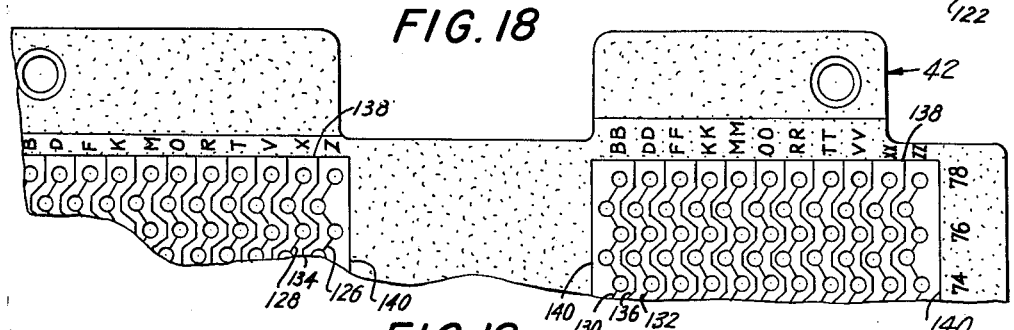
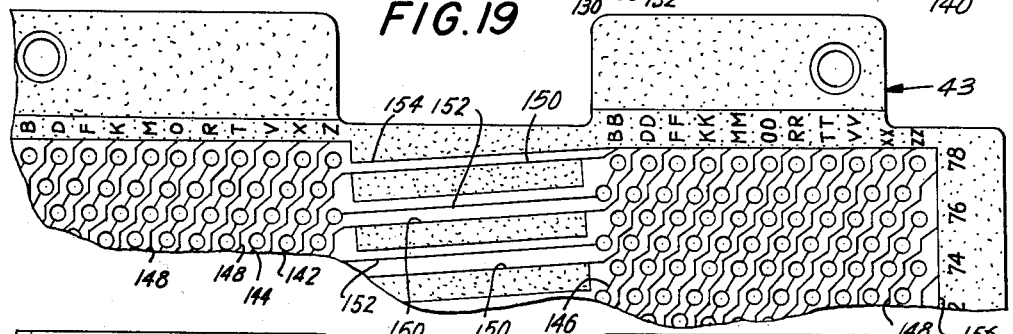
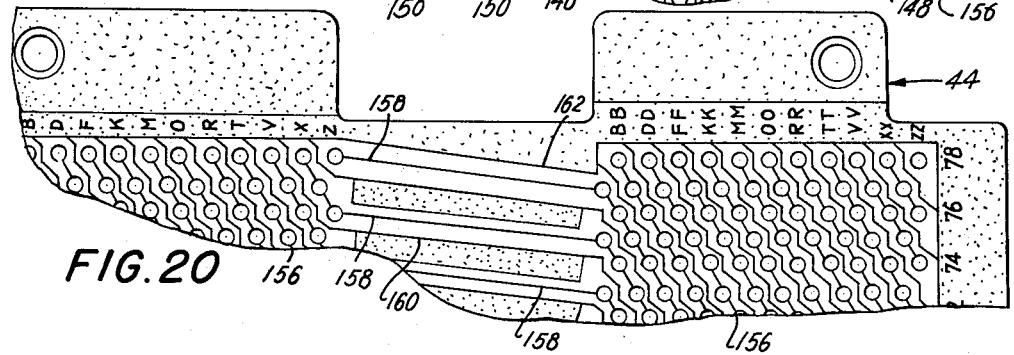

INVENTORS
MARTIN A. MITTLER
SEYMOUR OFFERMAN
ROBERT B. PITTMAN
RICHARD A. ROSENBERG
BY
James and Franklin
ATTORNEYS

United States Patent Office 3,179,913
Patented Apr. 20, 1965

3,179,913
RACK WITH MULTILAYER MATRIX BOARDS
Martin A. Mittler, Flushing, and Seymour Offerman, New York, N.Y., and Robert B. Pittman, River Edge, and Richard A. Rosenberg, Dumont, N.J., assignors to Industrial Electronic Hardware Corp., New York, N.Y., a corporation of New York
Filed Jan. 25, 1962, Ser. No. 168,791
24 Claims. (Cl. 339—18)

This invention relates to complex back panel wiring, and more particularly to multiple layer structural elements for accomplishing such wiring, especially for computer racks.

Computers have racks which slidably receive a large number of interchangeable printed circuit boards, sometimes called "mother boards." These are detachably received in edge board connectors at the back of the rack. The contacts of the connectors have lugs for numerous wire connections located behind the rack. There may be say one thousand lugs, and hundreds of connections to be made, for each rack. The lugs receive an average of three connections each, and many lugs receive even more connections. This is painstaking and expensive work, whether done by soldering, or by substitutes for soldering such as wire wrapping or crimping. An error in wiring is easy to make, and difficult to locate and correct.

The general object of the invention is to improve this back panel wiring, and more specifically to provide multiple layers of printed circuit boards which are coextensive with the entire array of edge board connectors at the back of the rack, in lieu of wiring. If enough like boards are needed they may be printed with specially laid out lines, and multiple boards are needed to take care of crossovers. Connections then are required between printed lines from board to board, and these are obtained by means of pins which are pushed through aligned holes in the boards to connect the circuit lines of different boards to each other and/or to a contact of the edge board connector. For the present purpose the lugs of the connector preferably are made in the form of female rather than male terminals, so that they can receive the inner ends of the pins.

The wiring operation then becomes a kind of nailing or pinning operation in which appropriately marked pins are forced through appropriately designated holes to establish the desired back panel wiring.

In most cases the back-panel wiring would not be duplicated sufficiently to justify the making of special printed circuit boards. In such case the desired wiring may be obtained by means of standardized matrix boards, and in accordance with the present invention, such boards may be provided, one having vertical lines, a second having horizontal lines, a third having diagonal lines, and a fourth having diagonal lines of opposite slope. For even greater flexibility we prefer to employ a fifth board having interrupted vertical lines, that is, short lines or dashes which connect a first and second hole, and a third and fourth hole, but not the second and third hole, nor the fourth and fifth hole, etc. We further provide a sixth board having interrupted transverse lines or dashes.

Moreover, a variety of pins are provided. These might be of different lengths, for use between different layers of boards, but we prefer to make the pins long enough to pass through all six boards, but different pins are provided with differently located bands of insulation which make them ineffective for electrical connection where desired. Pins having all of the different possible combinations of conductive and insulation portions may be made available, and by using the different pins with the six matrix boards described above, it is found that substantially all desired back-panel wiring may be obtained.

A further object of the invention is to insure good electrical contact between a pin and a board, and with this object in view we have devised an improved eyelet contact or bushing which is secured in each hole in the board. The contact has inwardly directed resilient tongues which insure excellent contact with a pin driven therethrough. The eyelet contact itself is permanently connected to its adjacent printed line, preferably by soldering, and the entire array or board full of such eyelet contacts may be soldered in a single operation. This is important because of the large number of holes.

In many cases it is important to prevent undesired cross communication between the necessarily closely adjacent circuit lines, that is, to prevent the equivalent of "cross talk" and "noise." A further object of the invention is to accomplish this, which is done by shielding the circuit lines. With matrix lines printed on one side of a board, an overall conductive or metallic coating is printed on the opposite side of the board (or on an equivalent added lamination), thus providing shielding between the successive boards. Moreover, in accordance with a further feature and object of the invention, grounded shielding lines are printed on the matrix side of the board between the matrix lines, so that there is shielding between lines on a single board, as well as shielding between the different boards.

To accomplish the foregoing general objects and other more specific objects which will hereinafter appear, our invention resides in the multilayer circuitry elements, and their relation one to another, as are hereinafter more particularly described in the following specification. The specification is accompanied by drawings in which:

FIG. 5 is a vertical section through one of a number of spacer botls passing through the boards;

FIG. 6 is a section through one of the mounting and shield grounding bolts passing through the boards;

FIG. 7 is a section through one of the connection pins passing through the boards;

FIG. 8 is an elevation of a pin;

Figure 21:
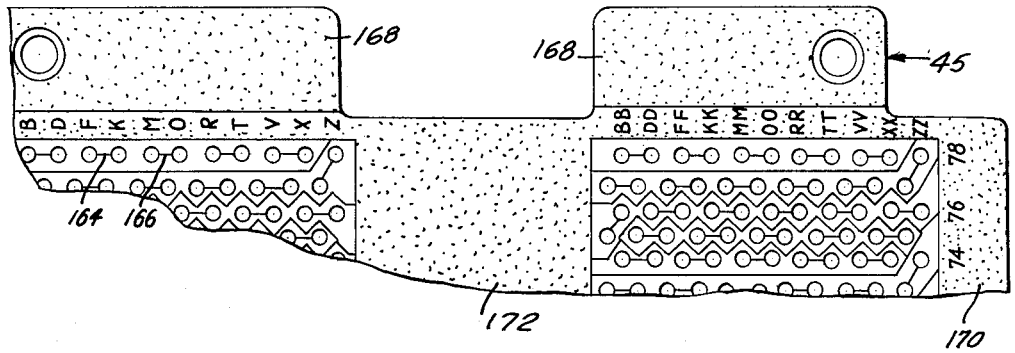
Figure 22:
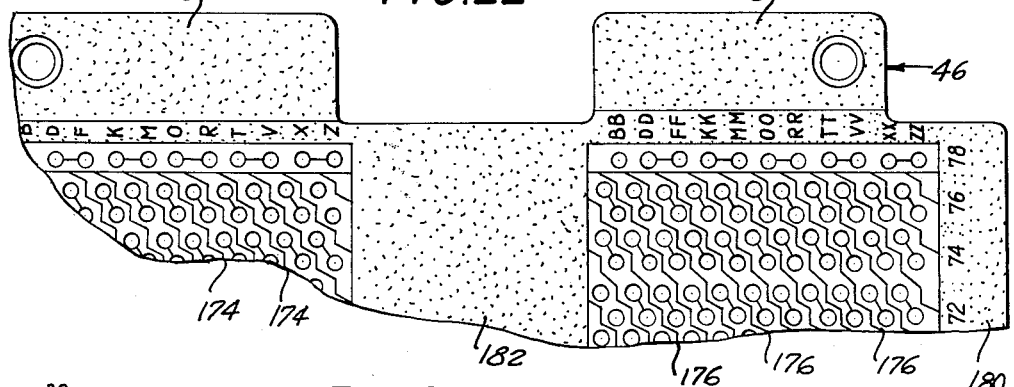
Figure 23:
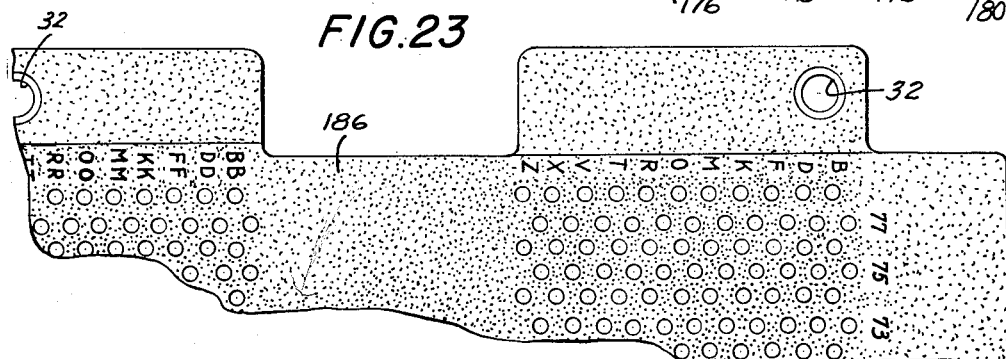
Figure 24:
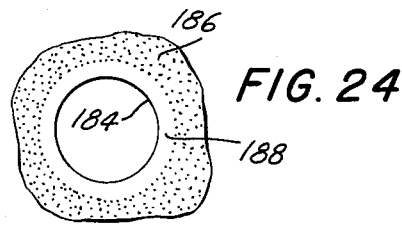

FIG. 8–A is a similar view showing a shortened pin for use where no connection with a connector terminal is wanted;

FIG. 9 is a fragmentary section drawn to enlarged scale and taken approximately in the plane of the line 9—9 of FIG. 8;

FIG. 10 is a fragmentary section drawn to enlarged scale and taken as though in the plane of the line 10—10 of FIG. 8, but through a pin having an insulation tip for use when connection to a connector terminal is not wanted;

FIG. 11 is a view like FIG. 8 but showing one of a large number of different kinds of pins having different numbers and locations of insulation bands;

FIG. 12 is an elevation of a closed-entry contact here employed to convert a male to a female terminal when edge-board connectors with female terminals are not available;

FIG. 13 is a transverse section taken in the plane of the line 13—13 of FIG. 12 and drawn to enlarged scale;

FIG. 14 is a plan view of an eyelet contact or bushing forming a part of the invention;

FIG. 15 is an elevation of the same;

FIG. 16 is a plan view of an insulation board showing some of the complete array of holes used therein and in all of the matrix boards and the base and cover boards;

FIG. 17 is a fragmentary view corresponding to the right end of the board shown in FIG. 16, printed to act as a matrix board with vertical circuit lines;

FIG. 18 is a fragmentary view corresponding to the right end of FIG. 16, printed to act as a matrix board with horizontal circuit lines;

FIG. 19 is a fragmentary view corresponding to the right end of FIG. 16, printed to act as a matrix board with diagonal circuit lines;

FIG. 20 is a fragmentary view corresponding to the right end of FIG. 16, printed to act as a matrix board with diagonal lines sloping in opposite directions;

FIG. 21 is a fragmentary view corresponding to the right end of FIG. 16, printed to act as a matrix board with interrupted vertical lines or dashes;

FIG. 22 is a fragmentary view corresponding to the right end of FIG. 16, printed to act as a matrix board with interrupted transverse lines or dashes;

FIG. 23 is a fragmentary view corresponding to the right end of FIG. 16, but inverted, and with the board printed over its entire surface except immediately at the holes, to act as a shield; and FIG. 24 is a fragmentary view drawn to enlarged scale at one of the holes in FIG. 23.

Figure 1:
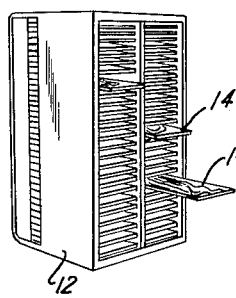
FIG. 1 is a perspective view of a computer rack to which the present invention may be applied.
Figure 2:
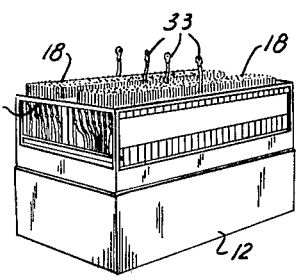
FIG. 2 is another view of the rack, turned face downward to expose the numerous terminals at the back which are to be connected by back-panel wiring.

Referring to the drawing, and more particularly to FIGS. 1 and 2, the rack generally designated 12 forms part of a computer. It has guide grooves for the slidable reception of printed circuit boards 14, called "mother boards." The inner or rear edges of the boards are received in edge board connectors located at 16 in FIGS. 2 and 3. These provide detachable connection to the printed lines on the mother boards 14. The edge board connectors themselves have a terminal for each contact, resulting in an array of a large number of terminals. In the particular case shown, there are 880 terminals, indicated generally at 18. Heretofore, these have been interconnected by insulated wire leads, requiring lengthy and painstaking work for properly connecting hundreds of such leads to the terminals.

Figure 3:
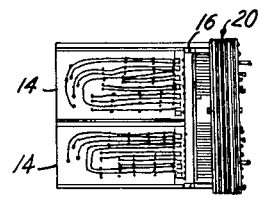
FIG. 3 is a view somewhat like a transverse section, showing two mother boards received in edge-board connectors to which multilayer circuitry has been applied.
Figure 4:
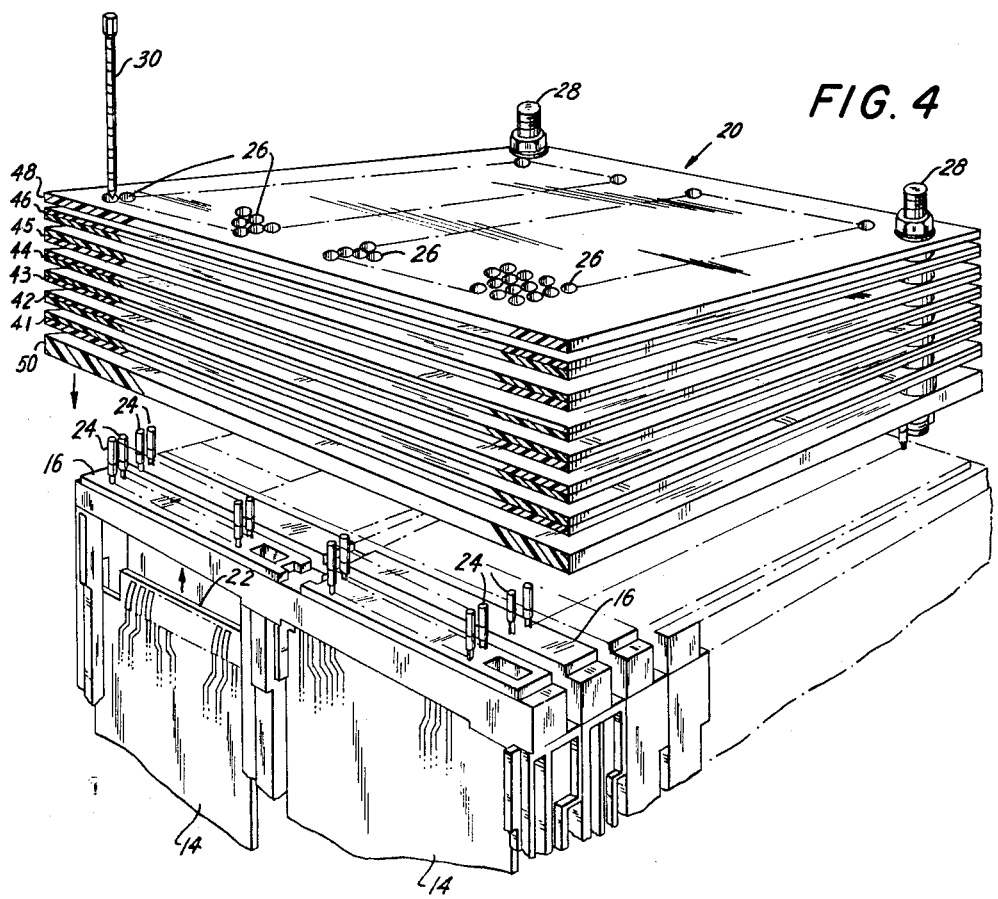
FIG. 4 is a perspective fragmentary view showing the matrix boards separated from the back of the rack, with one of the pins about to be inserted through the boards.

In accordance with the present invention this backpanel wiring is replaced by a multilayer matrix indicated generally at 20 in FIGS. 3 and 4, the said matrix and adapter terminals 24 being omitted in FIGS. 1 and 2. The matrix boards are co-extensive in area with the array of edge board connectors 16 and the terminals 18 thereof, and they are disposed in perpendicular relation to the mother boards 14.

Referring now to FIG. 4, the matrix boards generally designated 20 are shown disposed over but separated from the back of the rack, the latter having been turned face down as in FIG. 2, so that the mother boards 14 are upright, with their then upper edges received in the edge board connectors 16. In FIG. 4 one mother board has been slid down somewhat to show its edge 22. The connectors 16 may be conventional, except that female rather than male terminals are wanted, indicated at 24, FIGS. 4 and 7. In the specific case here shown male terminals have been converted to female terminals by the addition of closed-entry contacts to be described later. Only a few of the terminals are shown, but it will be understood that the connectors are filled with terminals.

The matrix boards 20 have a large number of holes, a few of which are indicated at 26, and in the present case, about half of these are located in alignment with the terminals 24. All of the holes in each board are in alignment with the corresponding holes in all of the other boards, and the boards are held in registration as by means of spacers and bolts, two of which are indicated at 28. There are also grounding bolts which pass through the matrix boards and into the rear frame of the rack, and these act as ground connections for shielding which is described later.

The circuitry is completed by pins, one of which is indicated at 30, and which are dimensioned to pass through the aligned holes, and which in many cases, though not necessarily in all, are received in the female terminals 24 to provide electrical connection between the terminals and printed lines on the matrix boards. Additional rows of holes located between the rows of terminals 24 make possible additional connections between matrix boards. In the present case each edge board connector has two rows of terminals, and the boards have two additional rows of holes between the collateral connectors.

FIG. 16 shows a typical insulation board with perforations therethrough, it being understood that perforations are completed all the way across the board between those shown at the upper left and those shown at the upper right, and similarly between those shown at the lower left and those shown at the lower right. The completion of the holes in the matrix board is indicated by the broken lines, and it will be understood that the area between the upper two broken lines is filled with holes, and similar remark applies to the area between the lower two broken lines. The holes are somewhat staggered or offset, to match the terminals of the edge board connectors. This pattern of holes is the same for all of the boards, although the printed circuit lines on the boards differ.

It will be noted that for identification or coding, the holes are lettered from A through Z in vertical direction, with alternate letters on one end, and the intermediate letters at the other end of the board. The lower array is distinguished from the upper by the use of double letters "AA," "BB," etc. instead of "A," "B," etc. In horizontal direction the holes are numbered 1–78, with alternate or odd numbers at the top, and the intermediate or even numbers at the bottom.

While referring to FIG. 16, it may be pointed out that the four end holes and one center hole marked 32 receive the spacer bolts 28 referred to in FIG. 4 and shown in FIG. 5. The four middle holes marked 34 are clearance holes for the four main bus wire connections shown at 33 in FIG. 2. The eight holes marked 36 receive the grounding bolts shown in FIG. 6.

Reverting to FIG. 4, in the present case there are six matrix boards marked 41–46. There is also a thicker base plate 50, and a thinner insulation cover board 48, which have no printed circuitry. The matrix boards 41–46 are printed with different lines or grids, and in the particular case here shown, the board 41 has vertical lines; the board 42 has horizontal lines; the board 43 has diagonal lines; the board 44 has diagonal lines of opposite slope; the board 45 has interrupted vertical lines or dashes; and the board 46 has interrupted transverse lines or dashes. Moreover, the opposite face of each matrix board, in this case the upper face, is coated with a metallic shield surface or coating, and even the grid side of the board has another grid of grounded shield lines alternating between the circuit lines.

The construction of a spacer bolt is shown in FIG. 5, there being a bolt 28 with insulation spacers 35 between the matrix boards. The assembly is held tightly clamped together by nuts 38 bearing against washers. In the present case, there are six matrix boards marked 41–46, respectively. Each board is laminated, for a reason explained later, and the top board 46 may, if desired, be surmounted by a cover board 48 which is made of insulation, and perforated and lettered like the others, but unprinted with circuit lines, so that it acts as an insulation cover for the assembly.

At the bottom the assembly preferably includes a heavier insulation base plate 50, which acts as a contact-locating plate, as is later explained, and which also acts as a base for the assembly. The bolt 28 is preferably shouldered at 40, so that the five bolts can be secured upright on the base before adding the matrix boards.

One of the grounding bolts is illustrated in FIG. 6. The bolt 52 extends down further than the spacer bolt 28, and receives a metal sleeve 54 which helps space the matrix board assembly from the frame 56 of the rack. In this case the bolt 52 is preferably threaded throughout its length, and receives a series of nuts 58 which are used in lieu of the spacers 35 shown in FIG. 5. This is done because bolt 52 serves incidentally for mounting but primarily for ground connection of the shielding, and it is desired to insure good electrical contact with the shield surface and lines of each matrix board, independently of the others. This may be accomplished by using the individual nuts 58. The nuts bear against metal bushings or eyelets 60 which are received in mating holes in the board, and which make electrical contact with a shield surface on top, indicated by the numeral 62, and with shield lines on bottom, indicated by the numeral 64. This electrical contact may be improved by the use of solder, as is usual when working with printed circuitry, and the soldering may be performed in any of several different known ways.

In FIG. 6 the uppermost eyelet, that is, the eyelet for matrix board 46, preferably has tongues struck inward to bear against the side of bolt 52, for electrical contact. Indeed such tongues could be provided in all the eyelets, and in that case insulation spacers could be used in lieu of the nuts 58, as at 35, FIG. 5. Even without tongues the nuts may be replaced by metal spacers, with reliance on the pressure exerted by the uppermost nut. For contact with the top shielding of the top matrix board 46 another method is to provide a large diameter clearance hole through the cover board 48, permitting the top nut to pass through the cover board and bear against the top eyelet. Still another suggestion is to add an additional eyelet to the cover board, with contact then from eyelet to eyelet to nut.

The relationship of a connector pin to the contact boards is illustrated in FIG. 7, referring to which the pin 30 is pushed through the boards 48, 46, 45, 44, etc., and then into a female terminal 24 of an edge board connector 16. The upper end portion of terminal 24 is received in a mating hole 66 of the base plate 50, and it will be understood that there are similar holes properly located for all of the terminals 24. In adding the matrix board assembly to the rack, the base plate 50 is applied first, and fits over all of the terminals, and serves as a locating plate for the same.

In the particular structure here illustrated, the edge board connectors 16 had male terminals 18, and the parts 24 were added to convert them to female terminals. The part 24 is shown in greater detail in FIGS. 12 and 13 of the drawing, referring to which the shank portion 68 is hollowed at its lower end 70 to receive a male terminal which is soldered thereto. The upper end is hollowed and cut away at one side to receive the spring element 72 which provides resilient contact. The top end of the transition piece is not cut away, and is a complete circle as shown at 74, so that the terminal is a closed-entry contact. The part 74 also holds the resilient element 72 against escape.

Reverting to FIG. 7, the holes in the matrix boards preferably have eyelet contacts or bushings to help insure good electrical contact with the pin 30 passed therethrough. An eyelet contact is drawn to larger scale in FIGS. 14 and 15, referring to which there is a sleeve portion 76, the upper end of which is flanged outward at 78. There are a plurality, in this case three tongues 80, struck inward to bear resiliently against the pin. This bushing is secured in the matrix board by soldering at its lower end to the printed line passing therethrough, the bushing being held by its flange on top and by the solder at the bottom. The bushing could be held in other ways, or by a snap fit, or a screw thread.

It does not contact the shielding at the top because the latter terminates short of the flange, as shown at 62 in FIG. 7. When the shielding surface 62 is deposited it does not come as far as the holes through the board. However, when the lines 64 on the bottom surface are deposited they do come to the hole, and indeed there is usually a ring of deposit around the hole, available for the intended soldering operation. This may be possible by dip-soldering, with all of the bushings inserted in their respective holes for a single dip soldering step. If desired, the soldering may be performed in different fashion, as by dropping a mating ring of solder around the end of each bushing, and then subjecting the entire board to heat, as by use of induction heating means.

To help hold the bushings in the board at the time of the soldering operation, a somewhat frictional or force fit may be provided, as by striking several longitudinal beads outwardly, as indicated at 82 in FIGS. 14 and 15. These beads or ridges bite into the board somewhat, and help hold the bushing in position until finally and permanently secured by the soldering operation. The tongues 80 are shorter than the thickness of the matrix board, and therefore need not be subject to solder during a dip-soldering operation if the dip is kept shallow.

The eyelet contacts or bushings are made of beryllium copper. After complete fabrication of the piece it may be heat-treated to give the tongues the desired resilience. A similar remark applies to the spring 72 in FIG. 13.

The pin 30 may be described with reference to FIGS. 8 through 11 of the drawing. A variety of pins is needed, but to simplify their manufacture we prefer to first make a basic pin which is made of metal of uniform diameter throughout its length. The head 84 is preferably hexagonal to facilitate subsequent machining of annular recesses where contact is to be avoided. In FIG. 8 there are six zones marked 91 through 96, corresponding to the six matrix boards and bushings. The pin may be turned to reduced diameter in any one or more of these zones, and the reduced diameter alone may be relied on to avoid contact with the bushings. However, it is preferred to make the device more foolproof by the addition of an insulation sleeve in a zone of reduced diameter, and this is shown in FIG. 9, in which the parts 86 and 88 have been filled with insulation indicated at 90.

This insulation may be applied in different ways. One method is to mold the insulation in position, and for this purpose a mold cavity receives the pin and has a nozzle at each zone. The insulation material is blocked where the pin has full diameter, but flows where the pin has been necked or reduced in diameter. For this purpose the insulation material may be nylon or other desired plastic material.

Another method is to use short individual sleeves of "shrink-on" plastic. The sleeve is dipped in a liquid which dilates the plastic, and then is slid over the pin and permitted to shrink into the necked portion. A suitable dilating liquid employs ninety percent acetone and ten percent xylol, which dilates the usual or general purpose thermoplastic materials. Another method is to use a heat-shrinkable plastic such as polyethylene, which requires no dilation liquid, and instead the short individual sleeves are moved into position and then subjected to heat to shrink the same into the necked portions of the pin.

Still another system is to employ metal pins and to omit the eyelet contacts or bushings where there is to be no connection. Expressed conversely, the bushings are inserted only where needed. In such case, however, the individual boards must be made special, instead of being all alike as they are when every hole is filled with an eyelet contact.

It will be understood that different types of pins are provided with different combinations of insulation sleeves.

Thus, in FIG. 11 the pin has insulation at two zones 91 and 95 corresponding to matrix boards 41 and 45.

In some cases, connection is to be made between one matrix board and another but not to the edge board connector. One simple way to accomplish this is to provide shorter pins, indicated at 100 in FIG. 8A. By omitting the lower portion 106 (FIG. 8) the pin 100 terminates just below the matrix board 41 (see Fig. 7) and does not reach the base plate 50 (FIG. 7) nor the female terminal 24.

Another method is to mold insulation around the lower end of the pin after reducing the latter in length and diameter, as shown in FIG. 10, in which the lower portion has been reduced in diameter at 102 and 103, with insulation material molded therearound as shown at 104. This portion corresponds to the metal part 106 of FIG. 8, and enters the female terminal but does not make electrical contact therewith.

The different possible combinations of insulation sleeve and the change at the lower end result in a large number of types, say 110 different pins, for six matrix boards, but not all may be needed. The pins are preferably numbered, as on one face of the hexagon head, to insure selection of a proper pin when setting up the circuitry.

The hexagon head is preferably counter-bored or hollowed as indicated at 108 in FIG. 8. This makes possible additional back panel wiring by use of ordinary insulated wires, in the rare case where the desired circuitry cannot be accomplished by means of the six matrix boards.

It has already been mentioned that one matrix board has horizontal lines, a second has vertical lines, a third has diagonal lines and a fourth has diagonal lines of opposite slope. A fragmentary end portion of each of these boards is drawn in FIGS. 17, 18, 19 and 20, respectively. FIG. 21 shows another board with interrupted vertical lines or dashes, while FIG. 22 shows still another board with interrupted transverse lines or dashes.

Referring to FIG. 17, the part there shown corresponds to the right end of FIG. 16 and illustrates the provision of "vertical" lines. It may be explained that the lines are called vertical by those working in this art because that would be their position when looking at the complete board as in FIG. 16 in which the long dimension of the board is considered to be horizontal, and the short dimension is considered to be vertical, and the code numerals and letters for the holes are printed in that relation, all as shown in FIG. 16.

In FIG. 17 the holes numbered "78" as printed directly and permanently on the board, are connected by a "vertical" printed circuit line 110 shown running from hole to hole across the drawing. The holes numbered "77" as printed on the board (the number 77 does not show in FIG. 17, it being on the cut away top portion of the board, but it does show in FIG. 16) are connected by a "vertical" printed circuit line 112. The holes numbered "76" are connected by a "vertical" printed circuit line 114.

These circuit lines are isolated or shielded by intermediate printed lines indicated at 116, 118, 120 etc. These shield lines are given a zig-zag formation (exaggerated in FIG. 17) because the holes themselves are in a staggered or offset relation. Some of the vertical shield lines may be made straight, where there is greater spacing between holes. The shield lines 116, 118 etc. are all grounded, and for this purpose they are connected at their ends to horizontal metal areas 122 (only one shown) which in turn are connected by vertical areas 124. The areas 122 and 124 form a rectangular peripheral frame area extending outward to the edge of the board, and at suitable points this frame includes the holes for the grounding bolts 52 shown in FIG. 6. More specifically, the peripheral ground area is engaged by the lower ends of the eyelets 60 shown in FIG. 6, and the eyelets are grounded through the nuts 58 and bolt 52. The shield lines 116, 118, 120 etc. form a shield grid within the peripheral frame area.

FIG. 18 is a similar view but shows a matrix board having "horizontal" lines. In this case, the lines are somewhat zig-zag because of the staggered relation of the holes. The holes marked "Z," as printed directly on the board, are connected by a "horizontal" line 126; the holes marked "X" on the board are connected by a "horizontal" line 128; the holes marked "BB," by a "horizontal" line 130; the holes marked "DD" by a "horizontal" line 132, and so on.

The horizontal circuit lines are shielded by additional printed lines located between the circuit lines. Thus there is a shield line 134 between horizontal lines 126 and 128, and a shield line 136 between horizontal lines 130 and 132. The shield lines terminate at their ends in vertical ground areas defined by the lines 138. These in turn are connected to horizontal ground areas defined by lines 140. As previously mentioned in connection with FIG. 17, the ground areas may extend out to the edge of the board, and the horizontal ground areas lead to eyelets and grounding bolts as shown in FIG. 6.

Referring now to FIG. 19, there are printed diagonal circuit lines. The circuit line beginning at the hole marked "Z," as permanently printed on the board, is shown at 142. The diagonal line beginning at the hole marked "X" on the board is shown at 144. The diagonal line beginning at the hole marked "FF" on the board is shown at 146.

As before, there are shield lines between the circuit lines, these shield lines being indicated at 148. The shield lines are somewhat zig-zag to better fit the space between the holes. Shield lines in each half of the board may be connected to one another as indicated by the lines 150. These may be widened into areas, as shown. The circuit lines also are connected, as indicated at 152, the situation in respect to these lines being much as though the upper and lower arrays of holes, as viewed in FIG. 16, were moved together, instead of being spaced apart as shown.

There are outside or peripheral grounding lines, indicated here at 154 and 156. These define peripheral ground areas which extend in a closed circuit entirely around the board, and which are connected to grounding bolts, as previously described. The net result is that all of the circuit lines are enclosed within shielding lines, and all of the shielding lines form a shielding grid which is grounded.

FIG. 20 shows a matrix board like that shown in FIG. 19, except that the diagonal lines slope in opposite direction. The holes are connected by printed circuit lines such as 156, and the circuit lines of the upper and lower banks may be connected as indicated at 158. Shielding lines are disposed between the circuit lines, and are connected to one another as indicated at 160. These may be widened into areas. They are also connected to peripheral grounding lines 162 which extend around the board; which define the inner edge of peripheral shielding areas which extend to the edge of the board; and which receive all of the shield lines to form a shielding grid. The shielding areas are connected to the grounding bolts previously described in connection with FIG. 6.

Referring now to FIG. 21, this matrix board has interrupted "vertical" lines or dashes. The short "vertical" line or dash 164 connects holes "F–78" and "K–78." The line or dash 166 connects holes "M–78" and "O–78." There is no connection between holes "K–78" and "M–78."

Shield lines are provided between the dash lines, and these shield lines sometimes may be straight and sometimes zig-zag, depending on the spacing between the rows of holes. This spacing was controlled in the present case by the previously existing location of the terminals of the edge board connectors in the particular design of computer, so that the spacing between rows is not uniform. The peripheral areas 168 and 170, and the middle area 172, are coated with shielding metal. The grid shield lines are all connected to and grounded by the metal-coated areas, which are grounded by the eight ground bolts like that shown in FIG. 6. A few residual holes are connected by transverse dashes, rather than waste the same. An example is seen at the corner "ZZ-78."

FIG. 22 shows the last matrix board with its dash lines. What is wanted are dashes extending in a direction transverse to the "vertical" dashes provided by the matrix board 45 shown in FIG. 21. Ordinarily therefore the matrix board 46 would have "horizontal" dashes. However, it will be recalled from FIG. 18 that the horizontal lines are zig-zag rather than straight, and thus the horizontal dashes become diagonal dashes in this particular case (arising, as mentioned before, from the fact that the particular edge board connectors employed in the particular computer here improved happened to have offset or staggered terminals, resulting in an offset or staggered arrangement of holes in the present matrix boards). Inasmuch as the dashes of board 46 might equally well be called either horizontal or diagonal, a more generic term such as "transverse" would seem appropriate, meaning transverse to the vertical dashes of matrix board 45. Some residual holes may be connected by vertical dashes, as shown in FIG. 22 for the row of holes marked "78" as permanently printed on the board. In such case the vertical dashes in FIG. 22 are offset or staggered relative to the vertical dashes of FIG. 21. The overall problem is simply to provide a great variety of possible connections, which in many cases may require a jump over a transverse line on another matrix board, and the dashes of the boards 45 and 46 make possible these bridging or jump connections.

It is for the same rason that two extra lines of holes are provided in the space between any two collateral edge board connectors. The connectors have two rows of terminals, and the total number of holes provided is nearly double the number of terminals. This adds to the available circuitry.

As before, the circuit lines or dashes are shielded by shield lines, which in this case extend diagonally and are somewhat zig-zag, as shown at 174 and 176. The shield lines extend to and are connected by peripheral shield areas 178, 180, and a middle shield area 182. The shield lines form a shield grid which is grounded to the shield areas, and these in turn are grounded by the grounding bolts shown in FIG. 6.

FIG. 23 shows the overall surface shielding 186 provided on the opposite face of each of the matrix boards. It is found convenient to apply metal to only one face of a circuit board, and therefore in the present structure each matrix board is laminated, it comprising two layers of insulation, each 1/16 inch thick, making a matrix board 1/8 inch thick. The bottom face of the lower board is printed with matrix lines as shown in FIGS. 17–22. The top face of the upper board is printed with the surface shielding illustrated at 186 in FIG. 23.

The code letters for the holes in FIG. 23 appear in reverse relation, so that when the laminations are secured back to back the letter "B," for example, on the upper lamination will appear over and correspond to the letter "B" on the lower lamination. The same applies to the other holes; for example, "BB" of FIG. 23 appears over "BB" of FIGS. 17–22.

The metal coating 186 in FIG. 23 is essentially an overall coating, but in practice important precautions must be taken. For example, there is a small annular area around each hole which is not coated, the purpose being to avoid grounding the flanges 78 (FIGS. 14 and 15) of the eyelet contacts or bushings.

This is shown in FIG. 24 in which any one of the numerous pin receiving holes of FIG. 23 is shown to greatly enlarged scale at 184. The deposited metal is represented by stippling at 186. This metal deposit stops short of hole 184, leaving an uncoated annular area 188.

The area 188 is wider than the width of the flange 78 (FIG. 15) of the eyelet contact. As seen in FIG. 7, this means that the surface shielding 62 does not reach the flange 78 at the top of the eyelet contact. This is in contrast with the situation at the bottom of the matrix board where the printed line becomes a printed ring which is actually soldered to the lower end of the eyelet contact.

Similar precaution is taken around the holes for the spacers and therefore the shielding is not carried up to the holes 32 in FIG. 23. The holes may be chamfered for this purpose. On the other hand, the metal deposit is carried all the way to those holes which receive the grounding bolts in order to insure grounding. These are the holes 36 in FIG. 16. In FIG. 6 the upper flanges of the eyelets 60 overlap and engage the shielding metal 62.

Instead of chamfering the holes 32, the deposit of metal may be stopped a little short of the hole, much as shown in FIG. 24 for the hole 184. The object in this case is to avoid unintended contact with the shank or cylindrical side wall of the spacer bolt, it being kept in mind that the spacer washers are made of insulation material rather than metal.

Referring to FIG. 5, the thicker bottom or base plate 50 has the same shape and holes as shown in FIG. 16 for the matrix boards. In addition it may have some further holes to receive mounting screws which preliminarily support it and space it from the rack frame of the computer. When the base board is applied it is fitted over the hundreds of terminals, as shown for one terminal in FIG. 7. The base board carries five spacer bolts like that shown at 28 in FIG. 5, and it also receives eight grounding bolts like that shown at 52 in FIG. 6. The latter alone could be used as mounting bolts, if desired. Thereafter the matrix boards are added one at a time, with the spacers 35 (FIG. 5) and the nuts 58 (FIG. 6) being added each time before adding the next matrix board. In this way the assembly of matrix boards is completed.

The pins are then inserted, and by connecting appropriate matrix lines the desired circuitry is built up. The two boards with interrupted lines or dashes help provide elevated crossover connections or jumps from one circuit line to another while missing some other line. In addition the long matrix lines of FIGS. 17–20 may be interrupted by "erasing" or scratching away a printed line at a desired point. For this reason it is desirable to show the numbers and letters identifying the holes on every matrix board, as well as on the top or cover board. In this way the desired location of the erasure may be specified between two holes.

The method of printing the identifying letters and numbers may vary, but in the present case they consist of metal coating the same as the circuit lines and shield lines and shield areas. All of these are printed at the same time in a single process.

In the specific case here shown the terminal locating plate or base 50 has a thickness of one quarter inch. The matrix boards are made up of two laminations each one sixteenth inch thick, giving them a thickness of one eighth inch. The open spacing between boards is one eighth inch. The matrix boards are about nine inches wide and seventeen inches long, and are preferably made of epoxy glass laminate.

The five spacer bolts are one quarter inch in diameter, and the spacers one half inch in diameter. The pins have a shank about two inches long and 0.062 inch in diameter. The machined or necked portions of the pin are reduced to a diameter of 0.042 inch. The head is one quarter inch long and 5/32 inch between flats. The design is preferably such that each pin is pushed all the way in as far as its head.

The eyelet contact or bushing which receives the pin has a diameter of 0.097 inch and a length of 0.156 inch. The flange diameter is 0.13 inch. The tongues have a length of 0.08 inch.

It will be understood that the foregoing specific dimensions have been given solely by way of illustration and are not intended to be in limitation of the invention.

It is believed that the construction, method of assembly, and method of use of our improved multilayer circuitry, will be apparent from the foregoing detailed description. Once the plan of numbered or coded pins and their corresponding holes has been set up, the wiring is easy to do, even by a relatively unskilled worker. The selected pins are inserted, each in its appropriate hole. In the event of error, the error is easy to locate and to correct, by pulling out a pin and inserting another or inserting it elsewhere, depending on the nature of the error.

The multilayer circuitry has been shown applied to a computer rack, but it is useful for other purposes, and particularly where there is a large array of numerous closely spaced terminals to be interconnected. It will also be understood that while we have shown the use of six matrix boards, a greater or lesser number of boards may be employed, depending on the complexity of the circuitry to be produced.

It will therefore be apparent that while we have shown and described the invention in a preferred form, changes may be made without departing from the scope of the invention, as sought to be defined in the following claims. In the claims the reference to "vertical" and "horizontal" is intended in a relative sense. The computer rack shown in FIG. 1 employs mother boards in horizontal position, but in other computer racks the mother boards are in vertical position. Moreover, any reference to "superposed" matrix boards refers to the position shown in FIGS. 2 and 4 when the circuitry is being completed by the insertion of the pins, even though in practice the entire assembly later may be used in upright position. The term "mother board" is used primarily to distinguish it from the term "matrix board." The term "mother board" refers to printed circuit boards detachably received in the edge board connectors. They are sometimes called "cards." The term "matrix board" applies to specially printed boards, as well as to horizontal, vertical and diagonal grids. Thus the said term "matrix board" may be said to be used as a convenient way to differentiate from the removable boards.

We claim:

1. A rack having guides for the reception of printed circuit mother boards, and having edge board connectors at the rear for detachable connection to the printed lines on the bother boards, and multilayer matrix boards for interconnecting the terminals of the edge board connectors, said matrix boards being coextensive in area with the array of edge board connectors and the terminals thereof and being disposed in perpendicular relation to the mother boards, each matrix board having printed conductive lines, means holding said boards in superposed relation, said boards having holes in alignment with the terminals of the connectors, a metal bushing secured in each hole, said bushing having spring tongues projecting inwardly and being connected to a printed circuit line on its board, and metal pins in some of said aligned holes, some of said pins being received by said terminals for connecting the same to printed lines on the matrix boards.

2. A rack having guides for the reception of printed circuit mother boards, and having edge board connectors at the rear for detachable connection to the printed lines on the mother boards, and multilayer matrix boards for interconnecting the terminals of the edge board connectors, said matrix boards being coextensive in area with the array of edge board connectors and the terminals thereof and being disposed in perpendicular relation to the mother boards, each matrix board having printed conductive lines, means holding said boards in superposed relation, said boards having holes in alignment with the terminals of the connectors, a metal bushing secured in each hole, said bushing having spring tongues projecting inwardly and being connected to a printed circuit line on its board, and metal pins in some of said aligned holes, some of said pins being received by said terminals for connecting the same to printed lines on the matrix boards, said pins having bands of insulation at bushings where no connection is wanted.

3. A rack having guides for the reception of printed circuit mother boards, and having edge board connectors at the rear for detachable connection to the printed lines on the mother boards, and multilayer matrix boards for interconnecting the terminals of the edge board connectors, said matrix boards being coextensive in area with the array of edge board connectors and the terminals thereof and being disposed in perpendicular relation to the mother boards, each matrix board having printed conductive lines, means holding said boards in superposed relation, said boards having holes in alignment with the terminals of the connectors, a metal bushing secured in each hole, said bushing having spring tongues projecting inwardly and being connected to a printed circuit line on its board, and metal pins in some of said aligned holes, some of said pins being received by said terminals for connecting the same to printed lines on the matrix boards, said pins having bands of insulation at bushings where no connection is wanted, one of said boards having vertical lines, a second having horizontal lines, a third having diagonal lines, a fourth having diagonal lines of opposite slope, a fifth having interrupted vertical lines, and a sixth having interrupted transverse lines.

4. A rack having guides for the reception of printed circuit mother boards, and having edge board connectors at the rear for detachable connection to the printed lines on the mother boards, and multilayer matrix boards for interconnecting the terminals of the edge board connectors, said matrix boards being coextensive in area with the array of edge board connectors and the terminals thereof and being disposed in perpendicular relation to the mother boards, each matrix board having printed conductive lines on one face and a conductive shielding surface on the opposite face, means holding said boards in superposed relation with spacers therebetween, said boards having holes in alignment with the terminals of the connectors, a metal eyelet contact bushing secured in each hole, said bushing having spring tongues projecting inwardly and being connected to a printed circuit line on one face of its board but insulated from the conductive shielding on the opposite face of the board, and metal pins in some of said holes, some of said pins being received in said terminals for connecting the same to printed lines on the matrix boards.

5. A rack having guides for the reception of printed circuit mother boards, and having edge board connectors at the rear for detachable connection to the printed lines on the mother boards, and multilayer matrix boards for interconnecting the terminals of the edge board connectors, said matrix boards being coextensive in area with the array of edge board connectors and the terminals thereof and being disposed in perpendicular relation to the mother boards, each matrix board having printed conductive lines on one face and a conductive shielding surface on the opposite face, means holding said boards in superposed relation with spacers therebetween, said boards having holes in alignment with the terminals of the connectors, a metal eyelet contact bushing secured in each hole, said bushing having spring tongues projecting inwardly and being connected to a printed circuit line on one face of its board but insulated from the conductive shielding on the opposite face of the board, and metal pins in some of said holes, some of said pins being received in said terminals for connecting the same to printed lines on the matrix boards, said boards additionally having grounded shield lines running between the aforesaid lines and forming a grid for additional shielding.

6. A rack having guides for the reception of printed circuit mother boards, and having edge board connectors at the rear for detachable connection to the printed lines on the mother boards, and multilayer matrix boards for interconnecting the terminals of the edge board connectors, said matrix boards being coextensive in area with the array of edge board connectors and the terminals thereof and being disposed in perpendicular relation to the mother boards, each matrix board having printed conductive lines on one face and a conductive shielding surface on the opposite face, means holding said boards in superposed relation with spacers therebetween, said boards having holes in alignment with the terminals of the connectors, additional holes between said holes, a metal eyelet contact bushing secured in each hole, said bushing having spring tongues projecting inwardly and being connected to a printed circuit line on one face of its board but insulated from the conductive shielding on the opposite face of the board, and metal pins in some of said holes, some of said pins being received in said terminals for connecting the same to printed lines on the matrix boards, said pins having bands of insulation at bushings where no connection is wanted, said boards additionally having grounded shield lines running between the aforesaid lines and forming a grid for additional shielding.

7. A rack having guides for the reception of printed circuit mother boards, and having edge board connectors at the rear for detachable connection to the printed lines on the mother boards, and multilayer matrix boards for interconnecting the terminals of the edge board connectors, said matrix boards being coextensive in area with the array of edge board connectors and the terminals thereof and being disposed in perpendicular relation to the mother boards, each matrix board having printed conductive lines on one face and a conductive shielding surface on the opposite face, means holding said boards in superposed relation with spacers therebetween, said boards having holes in alignment with the terminals of the connectors, a metal eyelet contact bushing secured in each hole, said bushing having spring tongues projecting inwardly and being connected to a printed circuit line on one face of its board but insulated from the conductive shielding on the opposite face of the board, and metal pins in some of said holes, some of said pins being received in said terminals for connecting the same to printed lines on the matrix boards, one of said boards having vertical lines, a second having horizontal lines, a third having diagonal lines, a fourth having diagonal lines of opposite slope, a fifth having interrupted vertical lines, and a sixth having interrupted transverse lines.

8. A rack having guides for the reception of printed circuit mother boards, and having edge board connectors at the rear for detachable connection to the printed lines on the mother boards, and multilayer matrix boards for interconnecting the terminals of the edge board connectors, said matrix boards being coextensive in area with the array of edge board connectors and the terminals thereof and being disposed in perpendicular relation to the mother boards, each matrix board having printed conductive lines on one face and a conductive shielding surface on the opposite face, means holding said boards in superposed relation with spacers therebetween, said boards having holes in alignment with the terminals of the connectors, additional holes between said holes, a metal eyelet contact bushing secured in each hole, said bushing having spring tongues projecting inwardly and being connected to a printed line on one face of its board but insulated from the conductive shielding on the opposite face of the board, and metal pins in some of said holes, some of said pins being received in said terminals for connecting the same to printed lines on the matrix boards, said pins having bands of insulation at bushings where no connection is wanted, one of said boards having vertical lines, a second having horizontal lines, a third having diagonal lines, a fourth having diagonal lines of opposite slope, a fifth having interrupted vertical lines, and a sixth having interrupted transverse lines, said boards additionally having grounded shield lines running between the aforesaid lines and forming a grid for additional shielding.

9. Multilayer circuitry comprising a plurality of superposed matrix boards, each board having printed wiring lines on one face, said boards having aligned holes located on the lines of the printed wiring, a metal contact bushing secured in each hole, said bushing having spring tongues projecting inwardly and being connected to a printed circuit line, and metal pins in said alinged holes for connections between said boards, said pins having bands of insulation engaging said bushings where no connection is wanted, one of said boards having vertical printed wiring lines, a second having horizontal lines, a third having diagonal lines, a fourth having diagonal lines of opposite slope, a fifth having interrupted vertical lines, and a sixth having interrupted transverse lines, the interrupted lines being printed as short dashes disposed end to end.

10. Multilayer circuitry comprising a plurality of superposed matrix boards, each board having printed wiring lines on one face and a conductive shielding surface on the opposite face, means holding said boards in superposed relation with spacers therebetween, said boards having aligned holes located on the lines of the printed wiring, a metal contact bushing secured in each hole, said bushing having spring tongues projecting inwardly and being connected to a printed circuit line on one face of the board but insulated from the conductive shielding on the opposite face of the board, and metal pins in said aligned holes for connections between said boards, said pins having bands of insulation engaging said bushings where no connection is wanted, one of said boards having vertical printed wiring lines, a second having horizontal lines, a third having diagonal lines, a fourth having diagonal lines of opposite slope, a fifth having interrupted vertical lines, and a sixth having interrupted. transverse lines, the interrupted lines being printed as short dashes disposed end to end.

11. Circuitry as defined in claim 10 in which each matrix board is made of two laminations secured together in back-to-back relation, the outer face of one board carrying the printed matrix lines, and the outer face of the other board carrying the conductive shielding surface.

12. Multilayer circuitry comprising a plurality of superposed shielded matrix boards, each board having printed wiring lines on one face and a conductive shielding surface on the opposite face, means holding said boards in superposed relation with spacers therebetween, said boards having aligned holes for connections therebetween, a metal contact bushing secured in each hole, said bushing having spring tongues projecting inwardly and being connected to a printed circuit line on one face of the board but insulated from the conductive shielding on the opposite face of the board, and metal pins in said aligned holes for connections between said boards, said pins having bands of insulation engaging said bushings where no connection is wanted, one of said boards having vertical printed wiring lines, a second having horizontal lines, a third having diagonal lines, a fourth having diagonal lines of opposite slope, a fifth having interrupted vertical lines, and a sixth having interrupted transverse lines, the interrupted lines being printed as short dashes disposed end to end.

13. Multilayer circuitry comprising a plurality of superposed shielded matrix boards, each board having printed wiring lines on one face and a conductive shielding surface on the opposite face, means holding said boards in superposed relation with spacers therebetween, said boards having aligned holes located on the lines of the printed wiring for connections therebetween, a metal contact bushing secured in each hole, said bushing having spring tongues projecting inwardly and being connected to a printed circuit line on one face of the board but insulated from the conductive shielding on the opposite face of the board, and metal pins in said aligned holes for connections between said boards, said pins having bands of insulation engaging said bushings where no connection is wanted, one of said boards having vertical printed wiring lines, a second having horizontal lines, a third having diagonal lines, a fourth having diagonal lines of opposite slope, a fifth having interrupted vertical lines, and a sixth having interrupted transverse lines, the interrupted lines being printed as short dashes disposed end to end, said boards additionally having grounded shield lines running between the aforesaid lines and forming a grid for additional shielding.

14. Circuitry as defined in claim 13, in which each matrix board is made of two laminations secured together in back-to-back relation, the outer face of one board carrying the printed matrix lines and the grounded shield lines, and the outer face of the other board carrying the conductive shielding surface.

15. Multilayer circuitry comprising a plurality of superposed matrix boards, each board having printed wiring lines on one face, means holding said boards in superposed relation, said boards having aligned holes located on the lines of the printed wiring, metal bushings in holes for connection between a printed line and a pin passing through the bushing, said bushing comprising a sheet metal cylinder with a flange at one end bearing against the side of the board opposite that having the printed wiring, the other end of the cylinder projecting somewhat beyond the printed face of the board and being peripherally soldered to the adjacent printed line, said bushing having inwardly directed resilient tongues struck inwardly from the wall of the cylinder intermediate the ends of the cylinder for resilient contact with a pin passing through the bushing.

16. A rack having guides for the reception of printed circuit mother boards, and having edge board connectors at the rear for detachable connection to the printed lines on the mother boards, and multilayer matrix boards for interconnecting the terminals of the edge board connectors, said matrix boards having printed conductive lines and being coextensive in area with the array of edge board connectors and the terminals thereof, and being disposed in perpendicular relation to the mother boards, said matrix boards having holes on said lines, said holes being in alignment with the terminals of the connectors, pins passing through holes and having metal contact parts of uniform diameter, and metal bushings in holes contacting lines at said holes, said pins and bushings being so dimensioned that the metal contact part of a pin makes contact with a bushing and line at a hole receiving the metal contact part of a pin where contact is wanted, some of said pins being received by said terminals for connecting the terminals to printed lines on the matrix boards.

17. A rack having guides for the reception of printed circuit mother boards, and having edge board connectors at the rear for detachable connection to the printed lines on the mother boards, and multilayer matrix boards for interconnecting the terminals of the edge board connectors, said matrix boards having printed conductive lines and being coextensive in area with the array of edge board connectors and the terminals thereof, and being disposed in perpendicular relation to the mother boards, said matrix boards having holes on said lines, said holes being in alignment with the terminals of the connectors, pins passing through holes and having metal contact parts of uniform diameter, some of said pins being received by said terminals for connecting the same to printed lines on the matrix boards, said matrix boards having additional holes between the aforesaid holes for additional pins providing additional connections between the matrix boards, and metal bushings in holes contacting lines at said holes, said pins and bushings being so dimensioned that the metal contact part of a pin makes contact with a bushing and line at a hole receiving the metal contact part of the pin where contact is wanted.

18. A rack having guides for the reception of printed circuit mother boards, and havnig edge board connectors at the rear for detachable connection to the printed lines on the mother boards, and multilayer matrix boards for interconnecting the terminals of the edge board connectors, said matrix boards being coextensive in area with the array of edge board connectors and the terminals thereof and being disposed in perpendicular relation to the mother boards, each matrix board having printed conductive lines, means holding said boards in superposed spaced relation, said boards having holes on said lines, there being more lines of holes than there are lines of terminals, some of said holes being in alignment with the terminals, pins having metal contact parts of uniform diameter in some of said aligned holes, and metal bushings in holes contacting lines at said holes, said pins and bushings being so dimensioned that the metal contact part of a pin makes contact with a bushing and line at a hole receiving the metal contact part of a pin where contact is wanted, some of said pins being received by said terminals for connecting the terminals to printed lines on the matrix boards.

19. A rack having guides for the reception of printed circuit mother boards, and having edge board connectors at the rear for detachable connection to the printed lines on the mother boards, and multilayer matrix boards for interconnecting the terminals of the edge board connectors, said matrix boards being coextensive in area with the array of edge board connectors and the terminals thereof and being disposed in perpendicular relation to the mother boards, each matrix board having printed conductive lines, means holding said boards in superposed relation, said boards having holes on said lines, said holes being in alignment with the terminals of the connectors, pins having metal contact parts of uniform diameter in some of said aligned holes, and metal bushings in holes contacting lines at said holes, said pins and bushings being so dimensioned that the metal contact part of a pin makes contact with a bushing and line at a hole receiving the metal contact part of a pin where contact is wanted, some of said pins being received by said terminals for connecting the terminals to printed lines on the matrix boards, one of said boards having vertical lines, a second having horizontal lines, a third having diagonal lines, a fourth having diagonal lines of opposite slope, a fifth having interrupted vertical lines, and a sixth having interrupted transverse lines.

20. Multilayer circuitry comprising a plurality of superposed shielded matrix boards, each board having printed wiring on one face and a conductive shielding surface on substantially all of the opposite face, means holding said boards in superposed relation with spacers therebetween, said boards having aligned holes located on the lines of the printed wiring, pins having metal contact parts of uniform diameter in said aligned holes for connections between said boards, and metal bushings in holes contacting lines at said holes but not contacting the shielding, said bushings having inwardly projecting resilient tongues, said pins and bushings being so dimensioned that the metal contact part of a pin makes contact with a line at a hole receiving the metal contact part of a pin where contact is wanted, said pins having bands of insulation where no connection is wanted, said boards additionally having grounded shield lines running collaterally between substantially all of the aforesaid lines on the first mentioned face of the board and forming a grid over substantially all of the face of the board for additional shielding.

21. Circuitry as defined in claim 20 in which each matrix board is made of two laminations secured together in back-to-back relation, the backs being bare and in direct surface-to-surface contact, the outer face of one board carrying the printed matrix lines and the grounded grid of shield lines, and the outer face of the other board carrying the conductive shielding surface.

22. Multilayer circuitry comprising a plurality of superposed matrix boards, each board having printed wiring lines on one face, means holding said boards in superposed relation with spacers therebetween, said boards having aligned holes located on the lines of the printed wiring, pins having metal contact parts of uniform diameter in said aligned holes for connections between said boards, and metal bushings in holes contacting lines at said holes, said pins and bushings being so dimensioned that the metal contact part of a pin makes contact with a bushing and line at a hole receiving the metal contact part of a pin where contact is wanted, said pins having bands of insulation where no connection is wanted, one of said boards having vertical printed wiring lines, a second having horizontal lines, a third having diagonal lines, a fourth having diagonal lines of opposite slope, a fifth having interrupted vertical lines, and a sixth having interrupted transverse lines, the interrupted lines being printed as short dashes disposed end to end.

23. Multilayer circuitry comprising a plurality of superposed shielded matrix boards, each board having printed wiring lines on one face and a conductive shielding surface on substantially all of the opposite face, means holding said boards in superposed relation with spacers therebetween, said boards having aligned holes located on the lines of the printed wiring, pins having metal contact parts of uniform diameter in said aligned holes for conections between said boards, and metal bushings in holes contacting lines at said holes, said pins and bushings being so dimensioned that the metal contact part of a pin makes contact with a bushing and line at a hole receiving the metal contact part of a pin where contact is wanted, said pins having bands of insulation where no connection is wanted, one of said boards having vertical printed wiring lines, a second having horizontal lines, a third having diagonal lines, a fourth having diagonal lines of opposite slope, a fifth having interrupted vertical lines, and a sixth having interrupted transverse lines, the interrupted lines being printed as short dashes disposed end to end, said boards additionally having grounded shield lines running collaterally between substantially all of the aforesaid lines and forming a grid for additional shielding.

24. Multilayer circuitry comprising a plurality of superposed matrix boards, each board having printed wiring lines on one face, means holding said boards in superposed relation, said boards having aligned holes located on the lines of the printed wiring, metal bushings in holes for connection between a printed line and a pin passing through the bushing, said bushing comprising a sheet metal cylinder with a flange at one end bearing against the side of the board opposite that having the printed wiring, the other end of the cylinder projecting somewhat beyond the printed face of the board and being peripherally soldered to the adjacent printed line, said bushing having inwardly directed resilient tongues struck inwardly from the wall of the cylinder intermediate the ends of the cylinder for resilient contact with a pin passing through the bushing, said cylinder having a plurality of axially directed leads expanded outwardly therefrom for frictional engagement in a hole receiving the cylinder.

References Cited by the Examiner

UNITED STATES PATENTS

| 840,537 | 1/07 | Weir | 339—18 X |
|---|---|---|---|
| 2,788,471 | 4/57 | Fulmer | 339—17 X |
| 2,876,391 | 3/59 | Sanders | 339—17 X |
| 2,889,532 | 6/59 | Slack | 339—18 |
| 2,894,240 | 7/59 | Mautner | 339—221 X |
| 2,948,834 | 8/60 | Kalfaian | 339—17 X |
| 2,967,285 | 1/61 | Freitas | 339—18 |
| 3,008,113 | 11/61 | Johnson | 339—17 |
| 3,049,645 | 8/62 | Skirpan | 339—18 |
| 3,076,862 | 2/63 | Luedicke et al. | 174—68.5 |
| 3,120,418 | 2/64 | Deakin | 339—221 X |

FOREIGN PATENTS

| 70,102 | 10/58 | France. |
|---|---|---|
| 739,828 | 11/55 | Great Britain. |

OTHER REFERENCES

Intellux "Electro-Technology," May 1961, page 250.

JOSEPH D. SEERS, *Primary Examiner*.

ALFRED S. TRASK, *Examiner*.